3,378,353
SEPARATION OF PHOSPHONITRILIC CHLORIDE MIXTURES
Clifford Henry George Hands, Pedmore, Stourbridge, England, assignor to Hooker Chemical Corporation, Niagara Falls, N.Y., a corporation of New York
No Drawing. Continuation of application Ser. No. 312,324, Sept. 30, 1963. This application Jan. 20, 1967, Ser. No. 610,715
Claims priority, application Great Britain, Oct. 4, 1962, 37,528/62
6 Claims. (Cl. 23—357)

ABSTRACT OF THE DISCLOSURE

The method of separating trimeric PNC from mixtures thereof with tetramer in proportions of trimer to tetramer of at least 70:30 by weight, which comprises dissolving the mixture in an organic solvent selected from the group consisting of petroleum ether, gasoline, kerosene, monochlorobenzene, carbontetrachloride, symmetrical tetrachloroethane, dioxane, benzene, toluene, xylene, carbon disulphide, and mixtures thereof at a temperature sufficient to effect complete dissolution and at a concentration less than that at which tetramer crystallizes at the constant temperature, cooling the solution until a constant temperature is observed, and filtering the solution substantially at the constant temperature to remove the crystals of substantially pure trimer which separate at that temperature.

---

This case is a continuation of Ser. No. 312,324, filed Sept. 30, 1963, now abandoned.

In the manufacture of polymers of phosphonitrilic chloride, hereinafter called PNC, for example, by the process described in U.K. patent specification No. 905,314 in which phosphorus pentachloride is reacted with ammonium chloride in a solvent, the $PCl_5$ being added slowly to the $NH_4Cl$, there is produced a crude product consisting of a mixture of linear polymers and cyclic polymers, the latter consisting mainly of the trimer with some tetramer and higher cyclic polymers. The cyclic polymers can readily be recovered from the mixture by dissolving them, for example, in petroleum ether, in which the linear polymers are insoluble. tI is desired for certain purposes to separate substantially pure trimer from the mixture of cyclic PNC polymers, as this compound is the most useful of the polymers for producing certain heat resistant resins and other products. In order to carry out this separation, it is known to subject the mixture to fractional distillation. It has also been proposed, in U.K. patent specification No. 904,109 to use an acid extraction process.

The present invention provides a process for separating trimeric cyclic PNC from a mixture of the cyclic polymers by crystallization which requires less elaborate equipment and is more convenient, bearing in mind that PNC is an obnoxious material, than the known processes.

In general, the cyclic PNC polymers can be separated from each other by fractional crystallization, since their solubilities in organic solvents are somewhat different. This, however, does not obviously afford a practicable process when applied to certain mixtures such as are often obtained in practice which contain the trimer and tetramer in the ratio of about 3:1 by weight, for this is approximately the ratio of the solubilities of these two polymers at all temperatures. Hence it might reasonably be assumed that fractional crystallization of mixtures containing the trimer and tetramer in ratios near 3:1 could not successfully be carried out or at least only with a very large number of stages.

The invention is based on our observation that when such mixtures of trimer and tetramer are dissolved in an organic solvent and the solution is cooled, a point is reached at which the temperature remains substantially constant for a period of some minutes while substantially pure trimer crystallizes out. This temperature is hereinafter referred to as the or a "constant temperature."

According to the invention, trimeric PNC is separated from mixtures thereof with tetramer in proportions of trimer to tetramer of at least 70:30 by weight by dissolving the mixture in an organic solvent at a temperature sufficient to effect complete dissolution and at a concentration less than that at which tetramer crystallizes at the constant temperature, cooling the solution until a constant temperature is observed, and filtering the solution substantially at the constant temperature to remove the crystals of substantially pure trimer which separate at that temperature.

The method of separating one constituent of a mixture by cooling a solution thereof until the desired constituent crystallizes at constant temperature is already known per se, but it could not have been predicted that this method could be applied to mixtures of PNC polymers containing trimer and tetramer in a ratio of at least 70:30 parts by weight, owing to the closeness of the ratio of their solubilities at all temperatures to this figure. A further feature of the invention which could not have been predicted resides in the fact that the concentration of trimer/tetramer solution which can be used and the percentage yield of trimer are improved if the mixture also contains a substantial proportion, e.g. at least 20%, of higher cyclic polymers (normally the 5-, 6- and 7-mer). The higher polymers are more soluble than the loyer polymers and remain in solution with the tetramer. It is, indeed, convenient to regard the higher polymers as part of the solvent rather than the solute, even though they may be (and usually are) present in the original mixture of polymers from which the trimer is to be separated.

Only a proportion of the trimer crystallizes out in the process of the invention, usually less than 50%. The remainder stays in solution with the other polymers. This mixture can be crystallized out as a whole and the product used for purposes for which a mixture of cyclic polymers is not deleterious.

Organic solvents preferred for use in the invention are petroleum ether, gasoline or kerosene monochlorbenzene, carbon tetrachloride and symmetrical tetrachlorethane. Other solvents which may be used in the invention are, for example, dioxane, benzene, toluene, xylene and carbon disulphide. Any of these solvents may be mixed with a substantial proportion, for example from a fifth to a half, of higher cyclic PNC polymers, thus increasing the yield of trimer which crystallizes at the constant temperature. A particularly advantageous mixture is one of petroleum ether and about an equal weight of higher cyclic polymers, which gives a yield of about 50% of trimer. Where the production of the PNC polymers is carried out in one of the solvents mentioned above, for example monochlorbenzene, the resulting reaction product, after removal of linear polymer, e.g. by agitation with activated charcoal, consists in effect of a mixture of trimer and tetramer in proportions as specified above dissolved in a mixture of the reaction solvent and higher PNC polymers. This solution can be used as the starting material for the process of the present invention, if necessary after adjustment of the concentration by evaporation or addition of solvent.

Ideally the concentration of the solution of trimer/tetramer mixture should be the maximum at which the tetramer is still retained when the trimer crystallizes out at the constant temperature. This concentration, which depends on the solvent used, can readily be ascertained by simple experiment. In practice, a concentration somewhat below this maximum should be used. Where the solvent is 100/120 petroleum ether, carbon tetrachloride or symmetrical tetrachlorethane, a satisfactory concentration is about 43%. For lower boiling petroleum ethers the concentration may be somewhat less. In the case of petroleum ether plus about 50% of higher cyclic polymers a satisfactory concentration is 56%, and for monochlorbenzene plus about 25% of higher cyclic polymers it is 68%, all these percentages being by weight. The higher the concentration within the stated maximum, the greater the proportion of trimer that crystallizes out.

The temperature at which the mixture is dissolved is not critical provided complete dissolution is effected. Temperatures of about 60° to 70° C. are suitable. As the solution is cooled, a point is reached, depending on the solvent, at which the trimer begins to crystallize out. At this point the temperature remains substantially constant owing to the heat of crystallization of the trimer. The rate of cooling is not critical provided that it is not too great to mask the occurrence of the constant temperature period, or to permit filtration at or near this temperature. Cooling rates of 1° C. to 0.05° C. per minute are suitable. Generally, filtration is sufficiently rapid to enable it to be carried out substantially at the constant temperature without taking steps to arrest the normal cooling of the liquid.

Filtration may be carried out in any conventional type of filter, for example, single or multiple leaf filters.

It is advantageous to stir the solution during cooling so that greater rates of cooling can be used and a more clearly defined constant temperature zone may be observed.

The process of the invention can be operated continuously. In this case the crude mixture of cyclic PNC polymers and the solvent are fed to a dissolving vessel and the solution passes to a cooler, for example, a pipe or film cooler, in which it is cooled at the desired rate while flowing. The rates of flow and cooling are so adjusted that after the solution reaches the constant temperature and has remained at this temperature for a few minutes (the time having been ascertained in a pilot experiment), it enters a filter. Crystals of substantially pure trimer are collected on the filter and the mother liquor proceeds to an evaporator in which the concentration in terms of trimer plus tetramer is restored to its original value, the recovered solvent being condensed and returned to storage. The mother liquor is passed to a second cooler, followed by a filter and evaporator. After one or more of these cycles the trimer/tetramer ratio of the mother liquor falls to such a level that the tetramer is not held in solution in the next cycle. The solid product from this latter cycle is mainly tetramer, the trimer remaining largely in solution. The mother liquor from this crystallization can therefore be returned to the dissolving vessel after bleeding off a proportion thereof to prevent build-up of higher polymers in the system. It will be observed that by this process not only substantially pure trimer, but also substantially pure tetramer is obtained in a continuous operation. The tetramer can be obtained when the ratio of trimer to tetramer in the solution has fallen to about 60:40 by weight.

The invention is illustrated by the following examples, the parts being by weight:

Example 1

120 parts of a mixture of trimeric and tetrameric cyclic PNC polymers in the ratio of 3:1 by weight were dissolved in 158 parts of 100/120° petrol at 60° C. The mixture was completely dissolved to form a 43.1% w./w. solution. The solution was air cooled while stirring, and the temperature recorded from time to time. The temperature fell at a steady rate until 35° C. was reached and then remained substantially constant for 4 minutes. During this constant temperature period a proportion of the trimer crystallized out. The mixture was filtered at the end of the constant temperature period and no significant cooling of the mother liquor took place during filtration.

23.2 parts of trimer of 95% purity were obtained, representing a yield of 24.5% by weight on the total trimer present.

Table 1 gives the time and temperature readings during the cooling of the solution:

TABLE 1

| Time mins.: | Temperature ° C. |
|---|---|
| 0 | 54 |
| 4½ | 49 |
| 17 | 39.5 |
| 21½ | 36.25 |
| 24 | 35 |
| 26 | 35.2 |
| 27 | 35.1 |
| 28 | 35 |
| 29 | 34.5 |
| 31 | 34 |
| 32½ | 33.5 |
| 34 | 33 |

Example 2

The procedure was the same as in Example 1, except that 100 parts of 3:1 trimer:tetramer mixture was dissolved in 155 parts of 100/120° petrol to give a 39.2% w./w. solution. In this case the constant temperature was 30.5° C.

The yield was 13.0 parts of 93% trimer, i.e. 16.1% by weight on the total trimer present.

Table 2 gives the time and temperature readings during cooling:

TABLE 2

| Time mins.: | Temperature ° C. |
|---|---|
| 0 | 60 |
| 12 | 46.5 |
| 22 | 39.5 |
| 27½ | 36.5 |
| 30 | 35 |
| 32½ | 34 |
| 36 | 33 |
| 40 | 31.5 |
| 41¼ | 31 |
| 43¼ | 30.5 |
| 46 | 30.75 |
| 48 | 30.5 |

Example 3

56 parts of a mixture of trimeric and tetrameric PNC in the ratio of 3.4:1 by weight were dissolved completely at a temperature just above 60° C. in 44 parts of a mixture containing 100/120° C. petroleum ether and higher cyclic PNC polymers (5–7 PNC) in the ratio of 1.3:1 by weight. The solution was cooled without agitation, to 20° C., ambient air being the cooling medium. Crystallization occurred at 20° C.

21.5 parts of solid containing 99% trimer were isolated. This represents 50% of the trimer present in the original mixture.

Example 4

67.5 parts of a mixture of trimeric and tetrameric PNC in the ratio of 3.5:1 by weight were dissolved completely at a temperature just above 60° C. in 32.5 parts of a mixture containing monochlorbenzene and higher cyclic PNC polymers (5–7 PNC) in the ratio of 3.3:1 by weight. The solution was cooled with agitation to 50° C., ambient air being the cooling medium. Crystallization occurred at 50° C.

13.1 parts of solid containing 99% trimer were isolated. This represents 25% of the trimer present in the original mixture.

Example 5

200 parts of a mixture of trimeric and tetrameric cyclic PNC polymers, in the ratio of 3:1 by weight were dissolved, under reflux, in 320 parts of 40/60 petroleum ether. The mixture was completely dissolved to form a 38.5% w./w. solution. The solution was air cooled with stirring. The temperature fell steadily to 32° C. and then remained substantially constant for 35 minutes. During this period trimer crystallized out. At the end of the period the slurry was filtered without significant cooling.

25.2 parts of trimer of 98.5% purity were obtained, representing a yield of 16.5% on the trimer originally present.

Example 6

133 parts of trimeric and tetrameric cyclic PNC polymers in the ratio of 3:1 by weight were dissolved at 60° C. in 240 parts of 62/68° petroleum ether. The mixture was completely dissolved to form a 35.5% w./w. solution. The solution was air cooled with stirring. The temperature fell steadily to 35° C. and then remained substantially constant for 20 minutes. At the end of the period the slurry was filtered without significant cooling.

21.1 parts of trimer of 95% purity were obtained representing a yield of 21.4% of the trimer originally present.

Example 7

450 parts of a mixture of trimeric and tetrameric cyclic PNC polymers in the ratio of 3:1 by weight were dissolved at 70° C. in 640 parts of symmetrical tetrachloroethane. The mixture was completely dissolved to form a 43.1% w./w. solution. The solution was air cooled with stirring. The temperature fell steadily to 37.5° C. and then remained substantially constant for 60 minutes. At the end of this period the slurry was filtered without significant cooling.

118.8 parts of trimer of 91.5% purity were obtained representing a yield of 32.2% of the trimer originally present.

Example 8

625 parts of a mixture of trimeric and tetrameric cyclic PNC polymers in the ratio of 3:1 by weight were dissolved in 797 parts of carbon tetrachloride at 70° C. The mixture was completely dissolved to give a 43.9% w./w. solution. The solution was air cooled with stirring. The temperature fell steadily to 32° C. and then remained substantially constant for 25 minutes. At the end of this period the slurry was filtered without significant cooling.

120 parts of trimer of 95% purity were obtained representing a yield of 24.3% of the trimer originally present.

What I claim is:

1. The method of separating trimeric PNC from mixtures thereof with tetramer in proportions of trimer to tetramer of at least 70:30 by weight, which comprises dissolving the mixture in an organic solvent selected from the group consisting of petroleum ether, gasoline, kerosene, monochlorobenzene, carbontetrachloride, symmetrical tetrachloroethane, dioxane, benzene, toluene, xylene, carbon disulphide, and mixtures thereof at a temperature sufficient to effect complete dissolution and at a concentration less than that at which tetramer crystallizes at the constant temperature, cooling the solution until a constant temperature is observed, and filtering the solution substantially at the constant temperature to remove the crystals of substantially pure trimer which separate at that temperature.

2. The method as claimed in claim 1, wherein the solvent is petroleum ether, monochlorbenzene, carbontetrachloride or symmetrical tetrachloroethane.

3. The method as claimed in claim 1, wherein the solvent is a mixture of an organic solvent and at least 20%, of higher cyclic PNC polymers.

4. The modification of the method claimed in claim 3, wherein there is used as the solution to be cooled the reaction mixture obtained by reacting phosphorus pentachloride and ammonium chloride in a solvent, after removal from the said mixture of linear PNC polymers.

5. The method as claimed in claim 1, wherein the mixture of cyclic PNC polymers and the solvent are fed continuously to a dissolving vessel means and the solution passes to a cooler means in which it is cooled at the desired rate while flowing, and thence passes to a filter means, the rates of flow and cooling in the cooler means being so adjusted that after the solution reaches the constant temperature and has remained at this temperature while trimer crystallizes out, it enters the filter means while still at the constant temperature.

6. The method as claimed in claim 5, wherein the mother liquor from the filter means is passed to an evaporator means in which the concentration in terms of trimer plus tetramer is restored to its original value.

References Cited

UNITED STATES PATENTS

| | | | |
|---|---|---|---|
| 2,853,517 | 10/1958 | Fitzgerald et al. | 260—551 |
| 2,886,587 | 5/1959 | Kolner | 260—475 |

OTHER REFERENCES

Weissberger: "Separation and Purification," part I, vol. III 2nd edition pp. 526–8.

MILTON WEISSMAN, *Primary Examiner.*

UNITED STATES PATENT OFFICE
CERTIFICATE OF CORRECTION

Patent No. 3,378,353                 April 16, 1968

Clifford Henry George Hands

It is certified that error appears in the above identified patent and that said Letters Patent are hereby corrected as shown below:

Column 1, line 46, "tI" should read -- It --. Column 6, line 41, after "value" insert -- and then passed to a second cooler means, filter means and evaporator means, whereupon the mother liquor is returned to the dissolving vessel means after bleeding off a proportion thereof to prevent build-up of higher PNC polymers in the system --.

Signed and sealed this 17th day of March 1970.

(SEAL)
Attest:

Edward M. Fletcher, Jr.
Attesting Officer

WILLIAM E. SCHUYLER, JR.
Commissioner of Patents